United States Patent
Wong, Jr.

[15] 3,660,933
[45] May 9, 1970

[54] HYDROPONICS SYSTEM AND METHOD
[72] Inventor: Edward Wong, Jr., Los Angeles, Calif.
[73] Assignee: Weingarten & Wong Enterprises, Inc.
[22] Filed: Mar. 2, 1970
[21] Appl. No.: 15,558

[52] U.S. Cl............................................47/1.2, 239/428.5
[51] Int. Cl............................................A01g 31/00
[58] Field of Search..............239/428.5; 47/1.2, 17–18, 47/34, 38–38.1; 119/3–4

[56] References Cited

UNITED STATES PATENTS

| | | | |
|---|---|---|---|
| 2,241,699 | 5/1941 | Cooper | 47/1.2 |
| 3,352,057 | 11/1967 | Ferrand | 47/1.2 |
| 2,188,875 | 1/1940 | Ellis | 47/1.2 |
| 2,674,828 | 4/1954 | Tegner | 47/1.2 |
| 2,007,479 | 7/1935 | Salles et al. | 119/4 |
| 2,189,510 | 2/1940 | Swaney | 47/1.2 |
| R21,820 | 6/1941 | Munsell | 47/1.2 |
| 2,316,832 | 4/1943 | Aghnides | 239/428.5 |
| 3,305,968 | 2/1967 | Dosedla et al. | 47/1.2 |

FOREIGN PATENTS OR APPLICATIONS

| | | |
|---|---|---|
| 1,054,671 | 1/1967 | Great Britain |
| 1,390,943 | 1/1965 | France |
| 48,649 | 5/1929 | Norway |

*Primary Examiner*—Robert E. Bagwill
*Attorney*—Fraser & Bogucki

[57] ABSTRACT

A hydroponics system for growing plants in an aqueous nutrient solution and including troughs for conducting a predetermined level of nutrient solution, is disclosed. The solution is supplied to each trough by a branch pipe extending the length of the trough and including a plurality of outlets spaced at uniform intervals. The nutrients are thereby dispersed relatively evenly along the length of the trough. Each outlet has an associated aspirator or eductor whereby air is entrained by the solution issuing from the outlet thereby providing substantially uniform aeration of the nutrient solution.

Each plant is supported by a receptacle having an open bottom through which the plant stem extends. The plant is held by resilient foam plastic inserts disposed between the plant stem and the receptacle wall.

13 Claims, 5 Drawing Figures

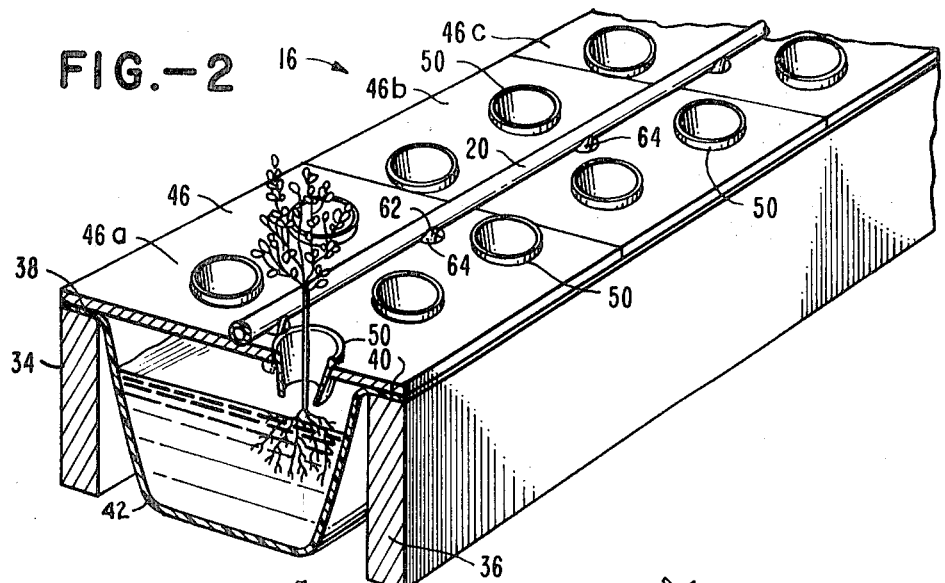
FIG.-2
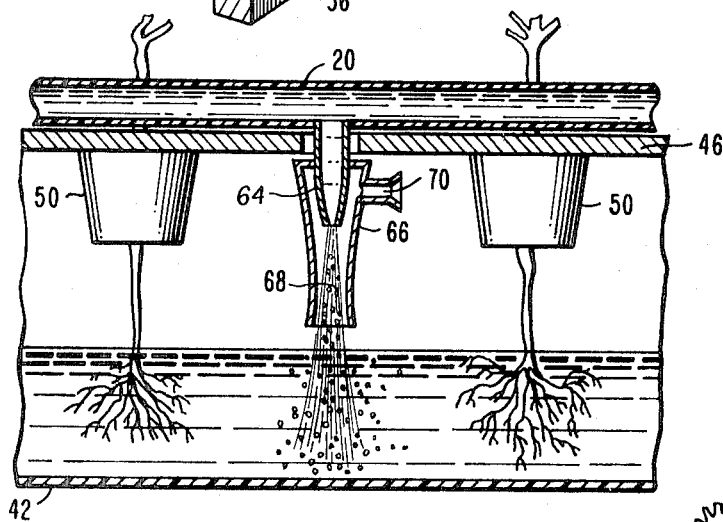
FIG.-3
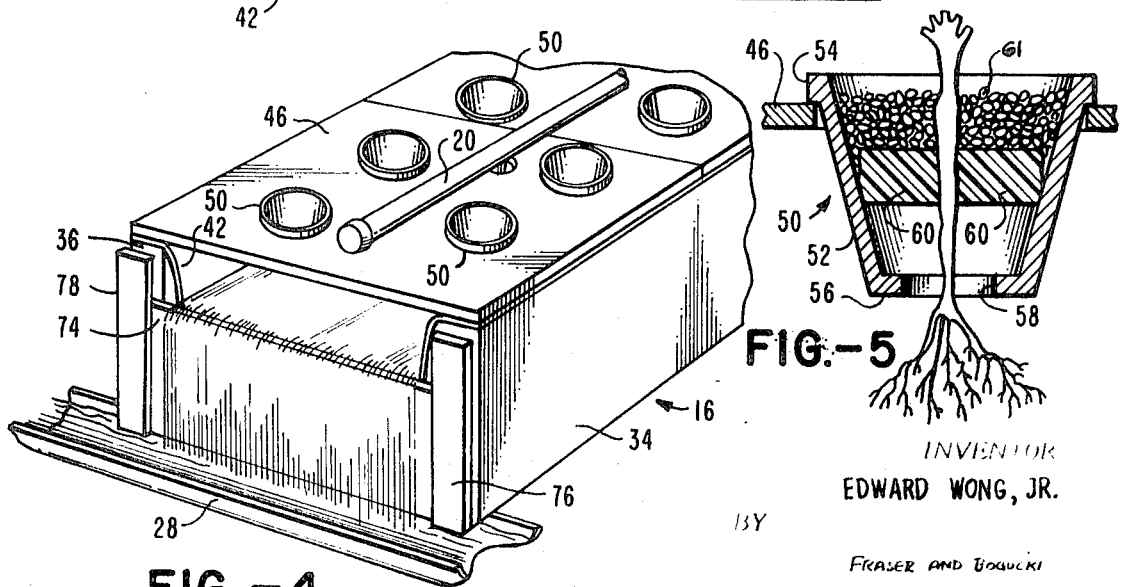
FIG.-4
FIG.-5
INVENTOR
EDWARD WONG, JR.
FRASER AND BOGUCKI
ATTORNEYS

HYDROPONICS SYSTEM AND METHOD

BACKGROUND OF THE INVENTION

1. Field of the Invention

This invention relates generally to hydroponics and particularly to systems and methods for growing plants hydroponically on a commercial scale and wherein an aerated, aqueous nutrient solution is efficiently and substantially uniformly distributed to all of the plants being grown.

2. Description of the Prior Art

One technique for the hydroponic growth of plants on a large scale makes use of a series of elongated troughs through which is circulated a nutrient solution containing the necessary growth-promoting substances. In these existing systems, the nutrient solution normally enters each trough at one end and is discharged at the other end with the result that all or most of the nutrients tend to be consumed by the plants nearest the end at which the solution is introduced to the detriment of the plants toward the discharge end. Often, there will be plainly evident a marked, steady decrease in plant size and yield from the inlet end to the discharge end of the trough.

Among the various factors substantially affecting plant growth is the amount of air supplied to the plant roots. Many existing hydroponic systems depend upon what little air is normally present in the nutrient solution together with the relatively stagnate air present in the trough above the level of the nutrient solution. Attempts to supplement the air in the nutrient solution have chiefly comprised various schemes for bubbling air under pressure into the nutrient solution. However, the amount of air required for a large hydroponics farm may necessitate the use of several high capacity motors and compressors and additionally these must be maintained in operation at all times. It will be obvious that the expense involved in the installation and maintenance of this machinery is considerable. Furthermore, in many of these systems the air is not supplied to all of the plants uniformly with the result that nonuniform plant growth takes place with an attendant decrease in overall yield.

SUMMARY OF THE INVENTION

In accordance with one of the broad aspects of the present invention, a large scale, commercial hydroponics system is provided for both supplying the nutrient solution and aerating the solution substantially uniformly along the entire length of the trough. Uniform and optimum growth and yield are thereby promoted.

Pursuant to one specific embodiment of the invention there is provided a series of troughs each of which is adapted to carry a predetermined level of nutrient solution circulated to and from a main reservoir by suitable pumping and conduit means. Each trough is supplied with nutrient solution by a branch pipe running substantially the entire length of the trough and disposed above the nutrient solution level. The branch pipe includes a plurality of outlets uniformly spaced along the length of the pipe. Associated with each outlet is an eductor whereby air is entrained by the stream of nutrient solution issuing at relatively high velocity from the outlet. The air thus entrained is substantially completely and uniformly mixed with the solution moving in the trough. Furthermore, the stream of nutrient solution impinging upon the surface of the solution causes agitation and mixing thereof to further increase the level of aeration and insuring that uniformity of the aerated nutrient solution is maintained along the entire length of the trough.

Another aspect of the invention relates to the support means for holding the growing plants so that the roots thereof are maintained immersed in the nutrient solution in the trough. The support means for each plant includes a tapered receptacle such as a plant pot having an open bottom through which the plant stem extends. The stem is held against transverse movement by a plurality of foam plastic inserts placed between the wall of the receptacle and the stem and which yield as the diameter of the stem increases during growth of the plant. The support means further includes a platform across the top of the trough and having one or more longitudinal rows of apertures for receiving the plant receptacles. According to one specific configuration, two rows of plants are supported by the platform with the branch pipe for supplying the nutrient solution resting on the platform between the plant rows. The platform has a central row of apertures through which the branch pipe outlet nozzles and eductors extend downwardly into the trough.

BRIEF DESCRIPTION OF THE DRAWINGS

Further objects, advantages and features of the invention will become evident from a reading of the ensuing description of the preferred embodiments which makes reference to the accompanying drawings, in which:

FIG. 2 is a perspective view of a portion of one of the troughs of the hydroponics system of FIG. 1;

FIG. 3 is a longitudinal cross section in elevation of one of the troughs of the system of FIG. 1 as seen along the plane 3—3;

FIG. 4 is a perspective view of one of the troughs of the system of FIG. 1 showing the discharge end and nutrient solution level controlling means; and FIG. 5 is a cross section view in elevation of a plant receptacle according to another aspect of the present invention.

DESCRIPTION OF THE PREFERRED EMBODIMENTS

Figure 1:
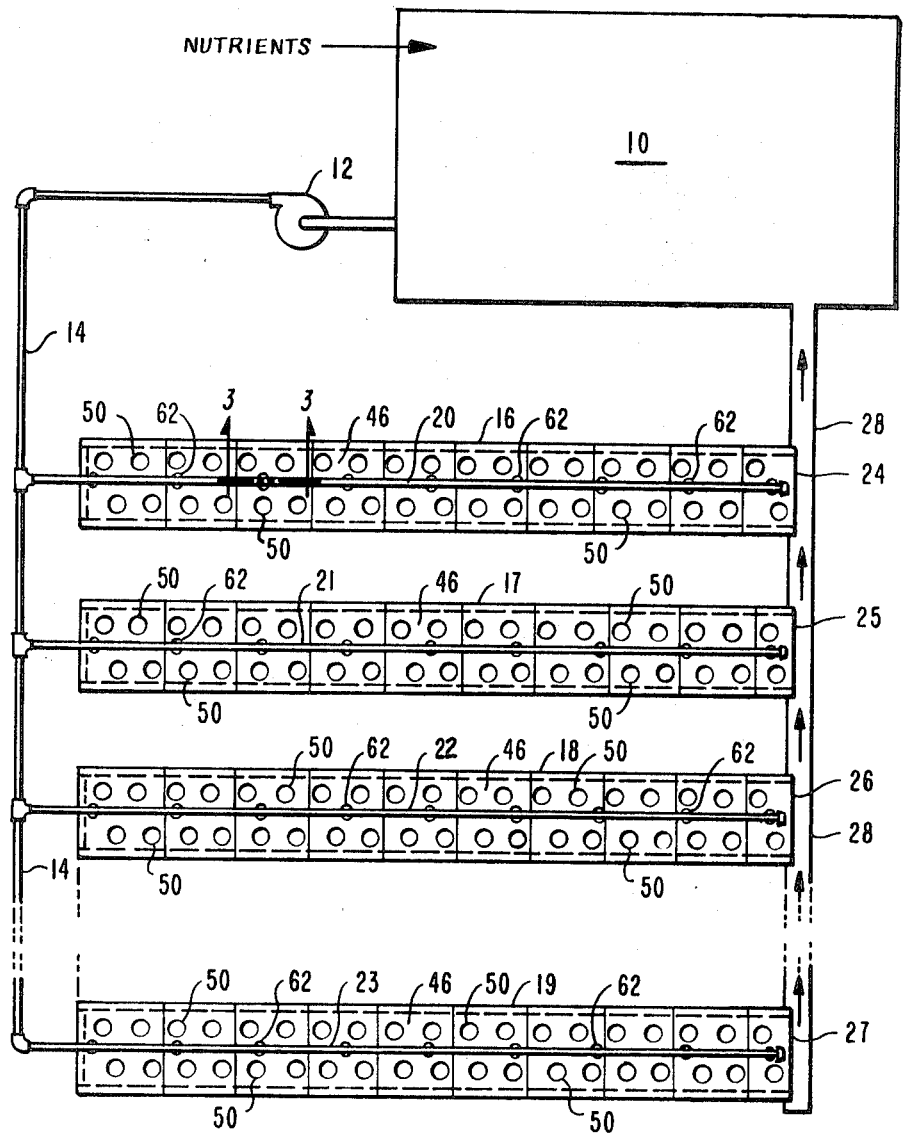
FIG. 1 is a plan view of a portion of a trough-type hydroponics system incorporating features of the present invention.

Turning now to the drawings, there is shown a hydroponics system which includes generally a reservoir 10 for holding a large quantity of aqueous nutrient solution, a pump 12 and a common supply pipe 14 coupling the reservoir 10, the pump 12 and a series of troughs 16, 17, 18 and 19. Any number of troughs may be provided; only four are shown by way of example. Further, the troughs may be divided into parallel-connected groups, each group being supplied by an individual pump, such as the pump 12, and a separate supply pipe, such as the pipe 14.

Dissolvable nutrients, in the appropriate quantity and proportions, are added as necessary to the reservoir 10 either manually or automatically. The nutrients required for the satisfactory promotion of growth, their proportioning, and so forth are all well known in the art and will not be discussed as they do not form any pertinent part of the present invention.

The troughs 16–19 are arranged in spaced, parallel relation and are individually supplied with nutrient solution by branch pipes 20, 21, 22 and 23, respectively, coupled to the common supply pipe 14. Each trough 16–19 includes an outlet end 24, 25, 26 and 27, respectively, for discharging the nutrient solution from the trough for return to the reservoir 10 via a conduit 28. The conduit 28 may simply take the form of an open or covered channel or ditch or closed conduit gently sloped so as to provide return flow under the influence of gravity to the reservoir 10.

Portions of trough 16 are shown in greater detail in FIGS. 2, 3 and 4. It is to be understood that the trough 16 is typical of the troughs of the system.

The trough 16 comprises a pair of parallel, spaced vertical walls 34 and 36 which may be fabricated of any suitable, durable material, for example, wood, steel, concrete or the like. The side walls 34 and 36 have horizontal, coplanar upper edges 38 and 40, respectively. Suspended between the side walls 34 and 36 and supported by the upper edges thereof and the ground intermediate the side walls, is an open channel 42 running the length of the trough and within which the nutrient solution flows. In one practical form of the invention, the channel 42 is heavy polyethylene sheet, although it will be apparent other materials resistant to attack by the nutrient solution may be utilized.

Spanning the upper edges 38 and 40 of the side walls 34 and 36 is a platform 46 which may be conveniently fabricated in sections such as 46a, 46b and 46c and constructed of hardboard, wood, or the like. The platform 46 serves several purposes: it firmly secures the upper edges of the polyethylene sheet 42 and forms a support for both the plants to be grown and the branch pipe 20 feeding the trough 16.

The platform 46 has a pair of longitudinally extending, parallel rows of circular openings 48 for receiving plant receptacles 50. As best shown in FIG. 5, each receptacle 50 has a tapering main section 52 depending from an outwardly extending flange 54 at the upper end. The outer diameter of the flange 54 is somewhat larger than the opening 48 so that the receptacle 50 is suspended thereby. Each receptacle 50 further includes a bottom 56 having an opening 58 through which the plant stem extends.

The plants to be grown by the system under discussion are initially cultivated from the seed hydroponically or in soil for a short period of time. The young seedlings, which are now large enough so that their roots will reach and become immersed in the nutrient solution, are transferred to the receptacles 50 where their remaining growth takes place. Each plant is held securely within the receptacle 50 by at least two foam plastic inserts 60, the inner and outer extremities of which engage the plant stem and receptacle wall, respectively. For additional lateral support as the plant becomes larger, pea gravel may be added to each receptacle 50 above the plastic inserts 60. As the plant grows and the stem diameter increases, the plastic inserts 60 resiliently yield to compensate for the diametric enlargement without damage to the plant or the necessity of having to replace the inserts with ones of different size to accommodate the larger plant stem.

The branch pipe 20 is preferably positioned so as to rest on the platform 46 along approximately the longitudinal center line thereof. Spaced at uniform intervals along the branch pipe 20 and projecting downwardly therefrom through apertures 62 formed in the platform 46, are a series of nozzles 64 for discharging streams of nutrient solution into the trough below. According to one practical example of the invention, each branch pipe is about 80 feet in length with outlet nozzles spaced every 8 feet. The branch pipe is made of 1¼ inch PVC (polyvinyl chloride) plastic piping which is relatively inexpensive and resists corrosion. Further, by laying the branch pipe on top of the platform 46, installation and maintenance are greatly simplified.

Each outlet nozzle 64 carries an aspirator or eductor 66 for introducing air into the stream flowing from the discharge nozzle. Each eductor 66 has a reduced diameter section 68 and an air inlet 70 upstream thereof. As the nutrient solution discharges from the nozzle 64 at a relatively high velocity as a result of the pressurization produced by the pump 12, a reduced pressure zone is formed within the constricted section 68 in accordance with well known principles of fluid dynamics and air is thereby drawn through the inlet 70 and entrained by the solution. In this fashion, the nutrient solution is aerated uniformly along the entire length of the trough. The nutrient solution streams issuing from the nozzles 64 furthermore agitate and thoroughly mix the aerated solution in the trough to insure substantially complete uniformity of nutrient concentration and air content throughout all portions of the trough.

The level of the nutrient solution within the trough is typically maintained at about five inches. This level is controlled by an overflow gate arrangement shown in FIG. 4. A gate 74 is carried by vertically extending slotted guide members 76 and 78 attached to the rear extremities of the side walls 34 and 36. The gate 74 is fixed at the appropriate vertical position within the slotted members 76 and 78 to establish the desired solution level.

What is claimed is:

1. In an hydroponic system, the combination comprising:
at least one trough;
a reservoir for holding a supply of aqueous nutrient solution; and
means connecting said reservoir and said trough for both supplying said nutrient solution to said trough and aerating said solution substantially uniformly along the length of said trough.

2. In an hydroponic system, the combination comprising:
at least one trough;
a reservoir for holding a supply of aqueous nutrient solution; and
means connecting said reservoir and said trough for circulating said nutrient solution to and from said trough and aerating said solution supplied to said trough substantially uniformly along the length of said trough.

3. In an hydroponic system, the combination comprising:
at least one trough for carrying a predetermined level of aqueous nutrient solution;
a reservoir for holding a supply of said solution;
means coupled to said reservoir and disposed above said nutrient solution level for supplying said trough with said nutrient solution substantially uniformly along the length of said trough and including means for aerating said solution as said solution is supplied to said trough.

4. The combination defined in claim 3 in which:
said solution supply means includes a plurality of outlets substantially evenly spaced along the length of said trough and said aerating means comprises an eductor coupled to each of said outlets.

5. In an hydroponic system, the combination comprising:
a reservoir for holding a supply of aqueous nutrient solution;
a plurality of elongated troughs, each trough adapted to support a plurality of plants to be nourished by said solution and further adapted to carry a predetermined level of said solution;
means for conducting solution under pressure from said reservoir to said troughs, said conducting means including branch pipes for supplying solution to individual troughs, each of said branch pipes supplying an individual trough and disposed above the level of said solution and said trough including a plurality of outlets spaced substantially uniformly along the length thereof;
eductor means operatively associated with each of said outlets for aerating the solution issuing from said outlet; and,
conduit means communicating with said troughs for returning said solution to said reservoir.

6. A combination, as defined in claim 5, in which:
each trough includes a pair of spaced, parallel sidewalls having upper edges lying substantially in a common horizontal plane;
and which combination further includes:
plant-carrying means supported by said upper edges, said branch pipe resting on said plant carrying means, said outlets extending through spaced apertures formed in said carrying means.

7. The combination, as defined in claim 5, in which:
each of said troughs includes a discharge end and overflow gate means at said discharge end positioned for predetermining the level of said solution in said trough, said return conduit being adjacent said discharge end.

8. The combination, as defined in claim 6, in which:
said plant-carrying means comprises a platform extending the length of said trough and having at least one longitudinally-extending row of openings for receiving plant-holding receptacles.

9. The combination, as defined in claim 5, in which:
each trough includes a pair of spaced, parallel sidewalls and means between said sidewalls defining an open channel for conducting said solution.

10. The combination, as defined in claim 5, in which:
said channel-defining means comprises a polyethylene sheet.

11. A method of growing plants hydroponically in an elongated trough, comprising the steps of:
supplying an aqueous nutrient solution to said trough substantially uniformly along the entire length of said trough and simultaneously aerating said solution during the supplying thereof.

12. A method of growing plants hydroponically in an elongated trough, comprising the steps of:
   supplying an aqueous nutrient solution to said trough at a plurality of points spaced substantially uniformly along the entire length of said trough and simultaneously aerating said solution being supplied at each of said points.

13. A method of growing plants hydroponically, as defined in claim 12, in which:
   said nutrient solution is supplied to said trough from above the level of the solution in said trough.

* * * * *